(12) United States Patent
Luo et al.

(10) Patent No.: US 7,407,230 B1
(45) Date of Patent: Aug. 5, 2008

(54) RECLINER REGULATING DEVICE

(75) Inventors: Xianhu Luo, Xiangfan (CN); Zhengkun Huang, Xiangfan (CN)

(73) Assignee: Hubei Aviation Precision Machinery Technology Co., Ltd., Xiangfan (CN)

( * ) Notice: Subject to any disclaimer, the term of this patent is extended or adjusted under 35 U.S.C. 154(b) by 0 days.

(21) Appl. No.: 11/770,590

(22) Filed: Jun. 28, 2007

(30) Foreign Application Priority Data

Feb. 16, 2007 (CN) .......................... 2007 1 0079390

(51) Int. Cl.
*B60N 2/235* (2006.01)
(52) U.S. Cl. ....................................................... 297/367
(58) Field of Classification Search .......... 297/366–369
See application file for complete search history.

(56) References Cited

U.S. PATENT DOCUMENTS

| | | | | |
|---|---|---|---|---|
| 5,984,413 A | * | 11/1999 | Baloche et al. ............. | 297/367 |
| 6,007,152 A | * | 12/1999 | Kojima et al. .............. | 297/367 |
| 6,318,805 B1 | * | 11/2001 | Asano ........................ | 297/367 |
| 2003/0155800 A1 | * | 8/2003 | Asano ........................ | 297/367 |
| 2003/0178879 A1 | * | 9/2003 | Uramichi ................... | 297/367 |
| 2005/0168034 A1 | * | 8/2005 | Fast ........................... | 297/367 |
| 2006/0055222 A1 | * | 3/2006 | Bonk et al. ................. | 297/367 |
| 2007/0040436 A1 | * | 2/2007 | Oki ............................ | 297/367 |

* cited by examiner

*Primary Examiner*—Peter R. Brown
(74) *Attorney, Agent, or Firm*—Workman Nydegger

(57) ABSTRACT

The present invention discloses a recliner regulating device comprising a cam, a return spring, a housing plate, a ratchet gear connected with a central shaft. The external hook of the return spring is fixed in a hole of the housing plate. Sliders are fitted in sliding grooves of the housing plate with the bosses of the sliders being attached with the sliding grooves of the cam. Wedges are fitted in the sliding grooves of the housing plate with the bosses of the wedges being attached with the sliding grooves of the housing plate. The sliding grooves for sliders are perpendicular to the sliding grooves for wedges. A two-point locking-up is formed between the self-locking surfaces of the sliders and the self-locking surfaces of the wedges after the position of the cam is fixed through the central shaft under the action of the return spring.

8 Claims, 8 Drawing Sheets

RECLINER REGULATING DEVICE

FIELD OF THE INVENTION

This invention relates to the field of mechanical technology, in particular to a recliner regulating device.

BACKGROUND OF THE INVENTION

At present, functions of angle-regulating and back's quick-folding can be realized in most of the recliner which then will be locked up after the angle-regulating is completed so as to fix the angle between the recliner seat and the recliner back.

The prior mode to achieve the above mentioned functions is disclosed for example in Chinese Utility Model Patent No. 200420017699.4 titled "Plate spring type armchair angle regulating and back folder nuclear installation". As shown in FIG. 1, in this device, two sliders 103 are supported by two self-locking surfaces 102 of the locking cam 101 under the action of the return spring. Therefore, the engagement between the slider teeth on two sliders 103 and the ratchet gear teeth is more stable, thereby the angle of the chair can be fixed after the angle between the chair seat and the chair back is regulated.

In the above armchair angle-regulating device, there is only one bearing point at the self-locking surface 102 of the self-locking cam 101 between each slider 103 and the locking cam 101. As a result, after the angle between the chair seat and the chair back was regulated and fixed when a user leans against and exerts forces on the chair back, the problem caused by supporting each slider 103 at only one point is that the engagement strength between the teeth of the slider 103 and the ratchet gear teeth is low, which causes the chair back unstable.

SUMMARY OF THE INVENTION

In views of this, the object of the present invention is to provide a recliner regulating device to solve the problem in the prior arts that the engagement strength between the teeth of the slider and the ratchet gear teeth is low when applying forces to the recliner back under the one-point support mode.

In order to solve the above problem, the present invention provides a recliner regulating device comprising a cam, a return spring, a housing plate, a ratchet gear, a central shaft, sliders having two self-locking surfaces, and wedges having two self-locking surfaces, wherein the cam, the return spring, the housing plate and the ratchet gear are connected with the central shaft; the sliders are connected with the housing plate; the wedges are fitted in sliding grooves of the housing plate; bosses on the wedges are connected with sliding grooves on the cam, and wherein a two-point locking-up is formed between the self-locking surfaces of the sliders and the self-locking surfaces of the wedges.

Preferably, the cam and the return spring are connected with the central shaft such that a square hole of the cam and an inner square hole of the return spring form a shaft connection through an outer square part of the central shaft.

Preferably, the slider has slider teeth and the ratchet gear has ratchet gear teeth; the slider teeth are disengaged with the ratchet gear teeth after the central shaft rotates; and after the cam is restored through the central shaft under the action of the return spring, the ratchet gear teeth engage with the slider teeth such that the locking-up between the self-locking surfaces of the sliders and the self-locking surfaces of the wedges is formed.

Preferably, the ratchet gear further has ratchet gear sliding surfaces which come into contact with the ratchet gear teeth after the cam is restored through the central shaft under the action of the return spring.

Preferably, the ratchet gear has bosses connecting with a connecting plate of the recliner back.

Preferably, the housing plate has bosses connecting with a connecting plate of the recliner seat.

Preferably, the device further includes a jacket connecting the ratchet gear with the housing plate.

When the angle-regulation of the recliner is completed, the device of the invention enables the two symmetrical self-locking surfaces of each wedge to correspond with the self-locking surfaces of the sliders and form a two-point locking-up. When the ratchet gear teeth engage with the slider teeth, the locking and unlocking of the sliders with the ratchet gear can be controlled through the rotation of the cam driven by the external force and the force applied by the spiral return spring so that the angle-regulation of the recliner back is realized. Since the ratchet gear has two segments of evenly arranged ratchet gear teeth and two segments of evenly arranged ratchet gear sliding surfaces, the recliner back can be quick-folded when the ratchet gear sliding surfaces face to the slider teeth. The above components are fixedly attached by the jacket into a relatively independent device which cannot be disassembled and free of maintenance. The device is versatile as it can be used with different connecting plates and applied to various vehicles depending on the user's requirements. The additional advantages of the invention are that the device has compacted structure, small volume, high strength, good unlocking performance on both sides, high regulation precision and the convenience of the angle-regulation and quick-folding of the recliner back, etc.

DETAILED DESCRIPTION OF THE INVENTION

The description will be made by way of an embodiment of the invention with reference to the attached drawings.

Figure 1:
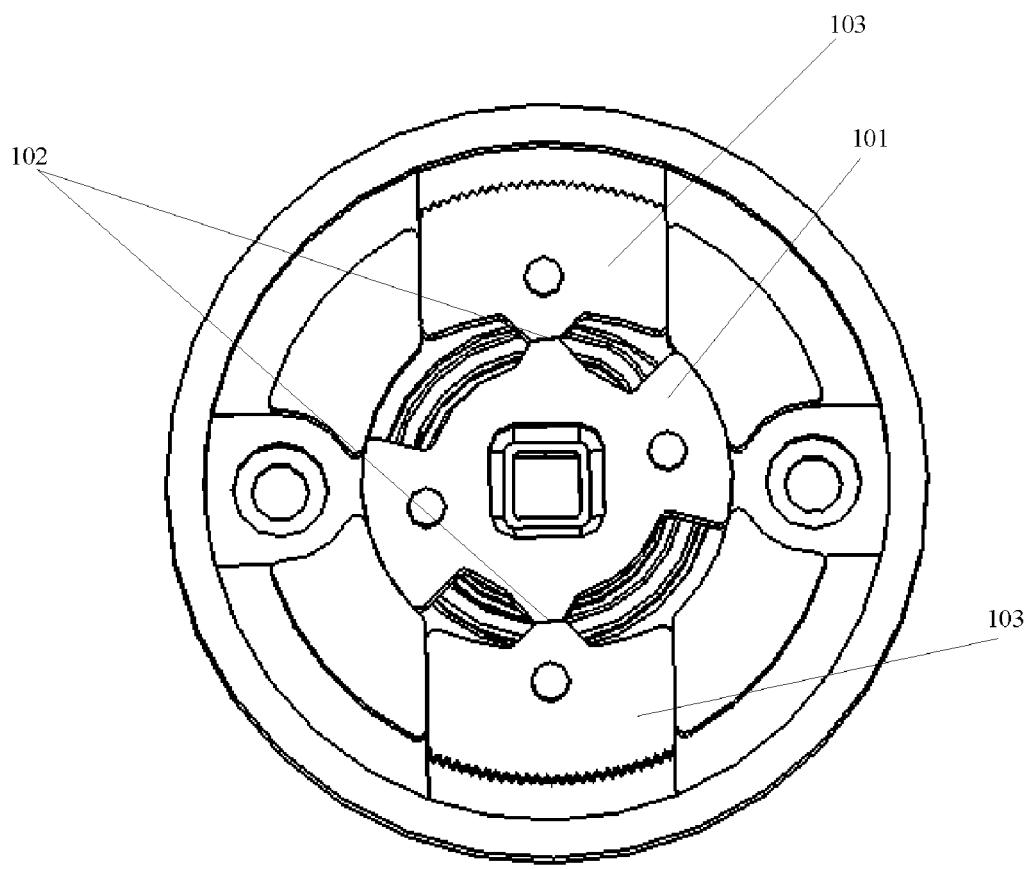
FIG. 1 is a sketch map of the one-point locking in the prior arts.
Figure 2:
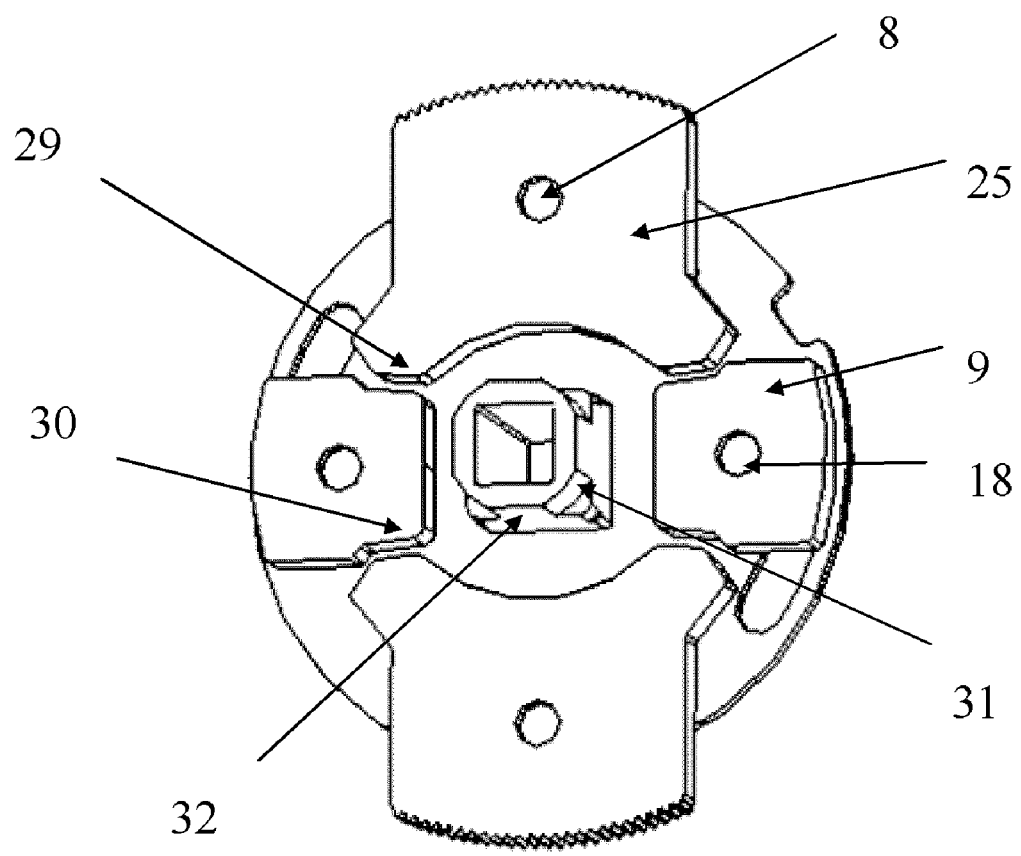
FIG. 2 is a front view of a cam locking-up part according to an embodiment of the invention.
Figure 3:
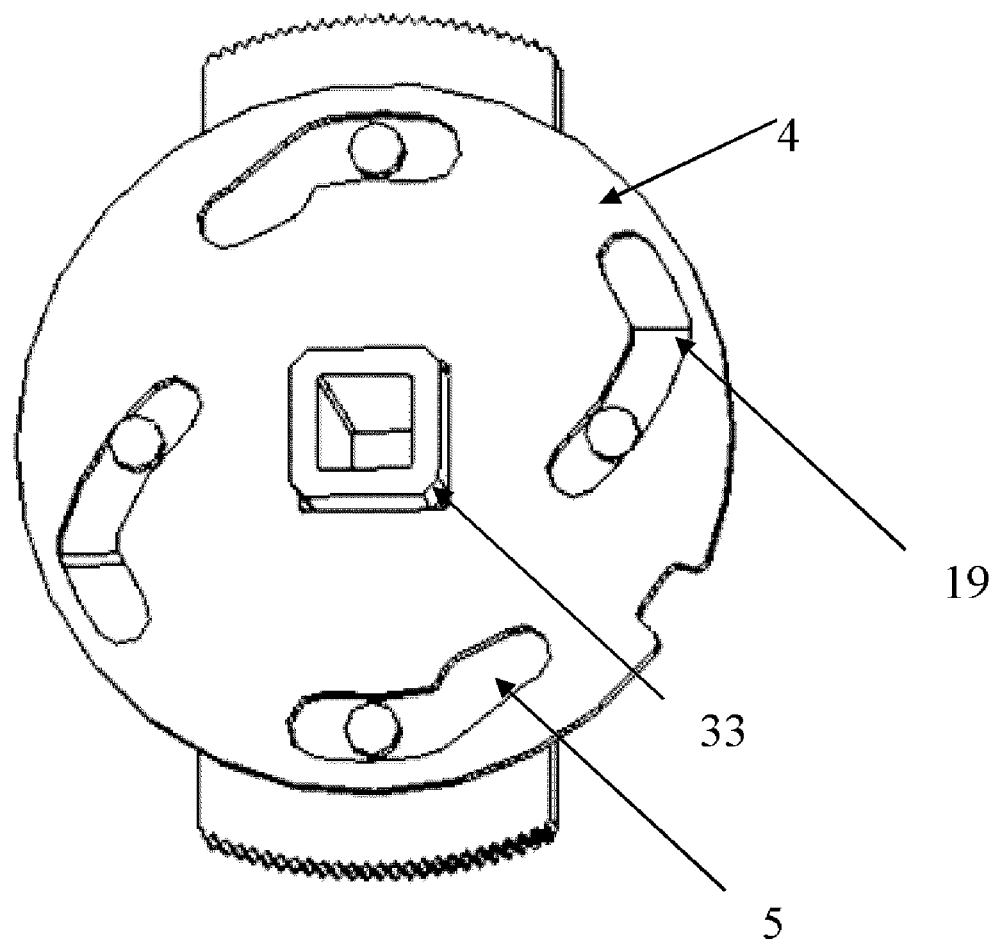
FIG. 3 is a rear view of the cam locking-up part according to the embodiment of the invention.
Figure 4:
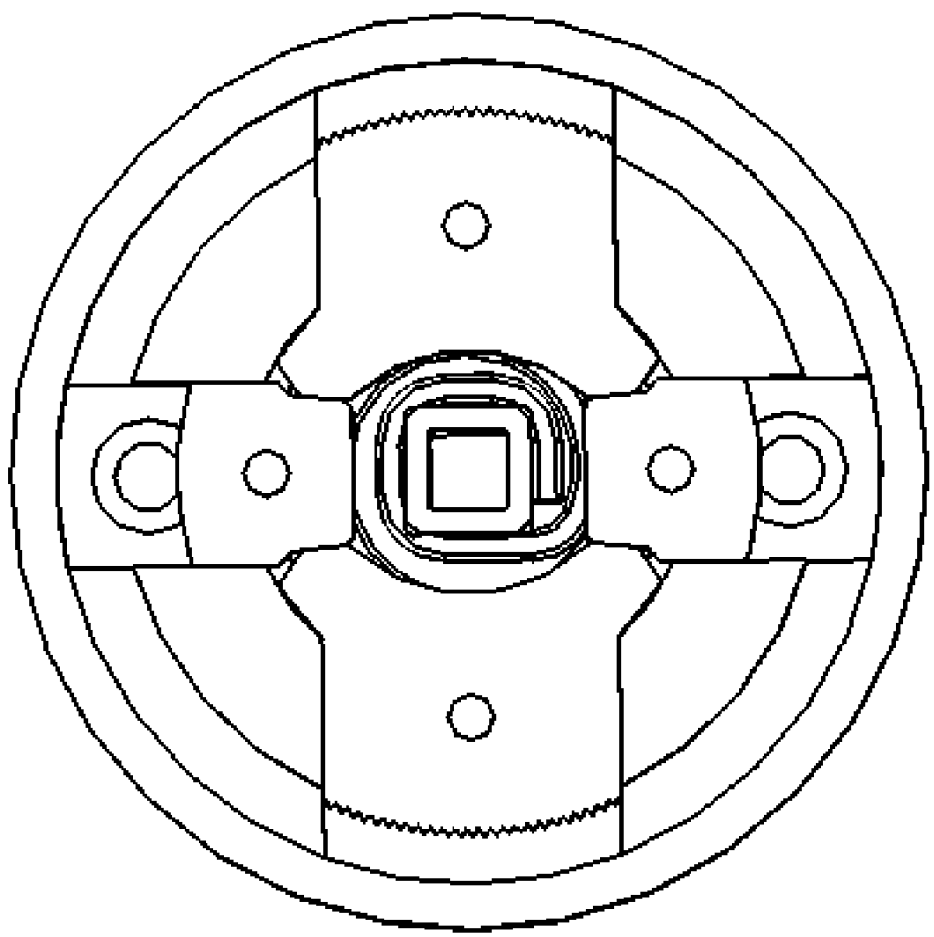
FIG. 4 is a sketch map of formation of locking-up in the embodiment of the invention.

Referring to FIGS. 2, 3 and 4, in the embodiment, the locking-up part of the cam 4 is described firstly so as to better understand the kernel technology of the locking-up in the invention. The cam 4 has two symmetrical sliding grooves 19 and two symmetrical sliding grooves 5. Two sliders 25 are connected by means of the bosses 8 thereon with the sliding grooves 5, two wedges 9 are connected by means of the bosses 18 thereon with the sliding grooves 19. A new recliner regulating device is formed when the locking-up part of the cam 4 is used for the angle-regulation of the recliner.

After the cam 4 rotates, the two symmetrical self-locking surfaces 29 on the sliders 25 and the two symmetrical self-locking surfaces 30 on the wedges 9 form a two-point locking-up.

The recliner regulating device having the locking part of the cam 4 will be described with reference to the perspective view of the embodiment.

Figure 5:
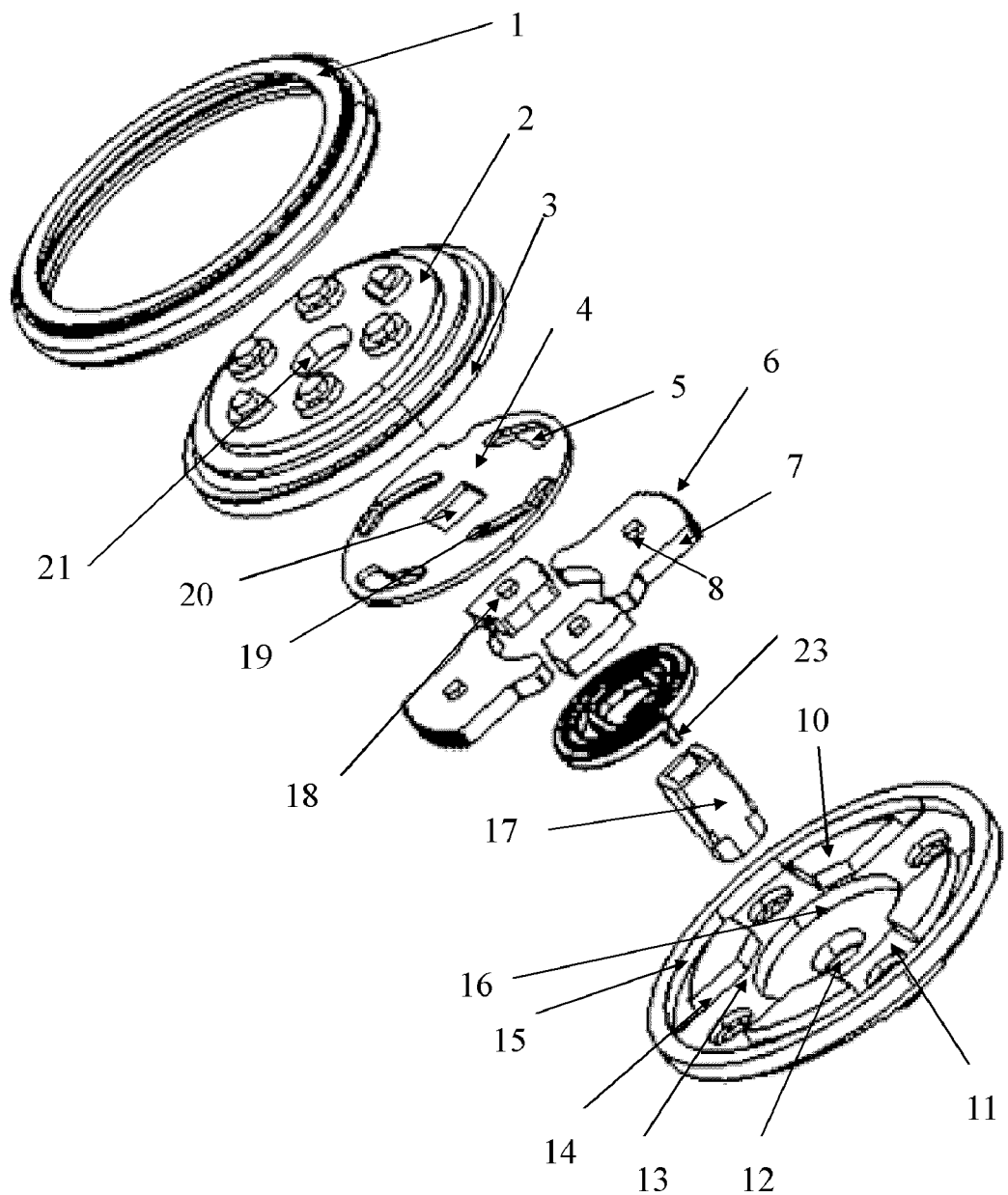
FIG. 5 is a perspective view of a recliner regulating device according to an embodiment of the invention.
Figure 6:
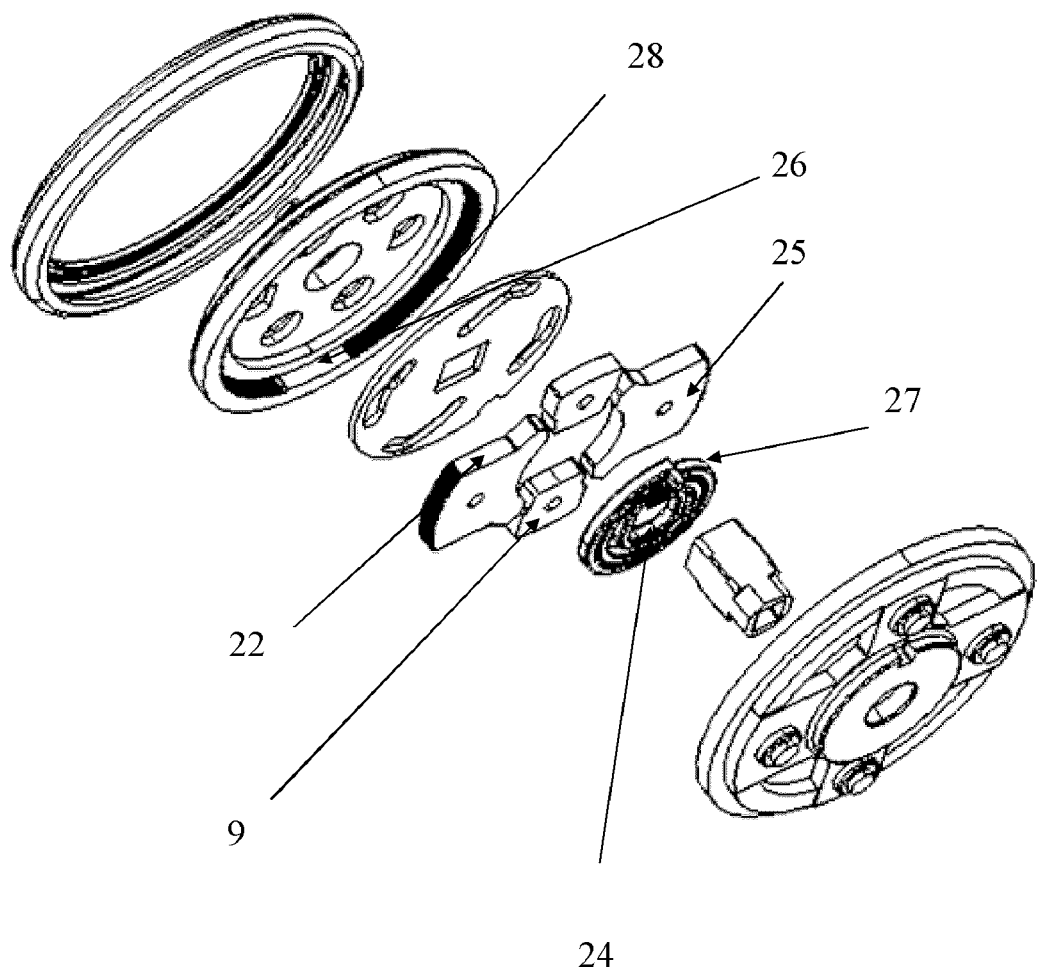
FIG. 6 is a further perspective view of the recliner regulating device according to the embodiment of the invention.

As shown in FIG. 5 and FIG. 6, the two symmetrical sliders 25 are fitted in two sliding grooves 13 of the housing plate 10. A clearance fit is formed between the side surfaces 7 of the sliders and the side surfaces 14 of the sliding grooves on the housing plate 10. The sliders 25 have on their distal ends a segment of slider teeth 6 and have on their middle a boss 8, respectively.

The two symmetrical wedges 9 are fitted in the sliding grooves 11 of the housing plate 10. A clearance fit is formed between the side surfaces 22 of the wedges 9 and the sliding grooves 11. The wedges 9 have on their middle a boss 18.

Figure 9:
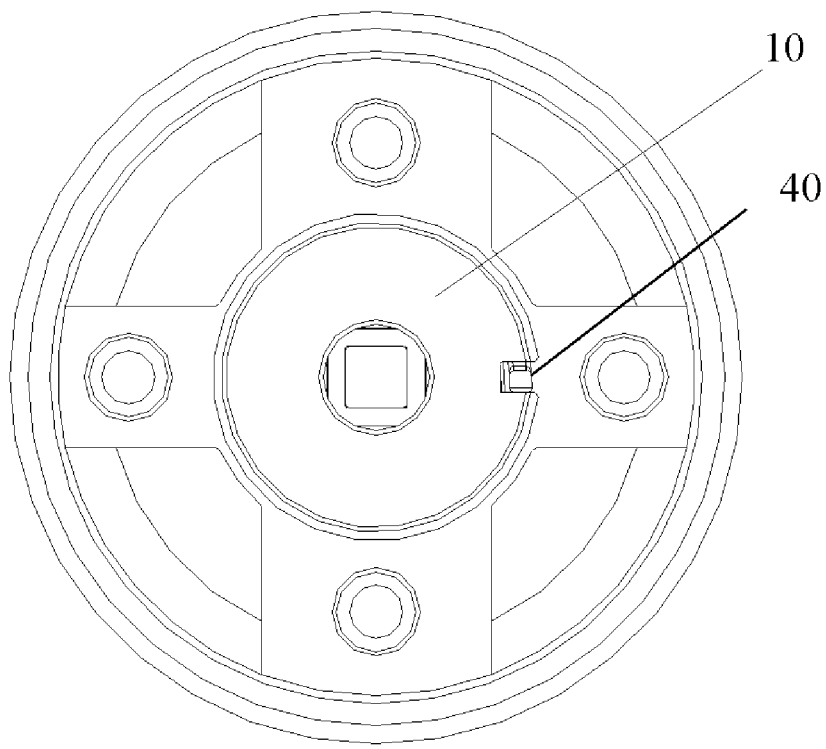
FIG. 9 is a rear view of the assembled recliner regulating device according to the embodiment of the invention.

The cam 4 has two symmetrical cam grooves 5 for driving the sliders 25 and two symmetrical cam grooves 19 for driving the wedges 9. A square hole 20 in the center of the cam 4 is fitted with the central shaft 17. Two segments of symmetrical ratchet gear teeth 28 and two segments of symmetrical ratchet gear sliding surfaces 26 are arranged on the ratchet gear 2. A round hole 21 in the center of the ratchet gear 2 and the filleted end portion 33 on the central shaft 17 are fitted with clearance. The outer circumference 3 of the ratchet gear 2 is fitted with the inner circumference 15 of the housing plate 10. A round hole 12 in the center of the housing plate 10 is fitted with the filleted end portion 31 of the central shaft 17. The inner square hole 24 in the center of return spring 27 located in the circular groove 16 of the housing plate 10 is fixed on the outer square part 32 of the central shaft 17. The external hook 23 of the return spring 27 is fixed in the hole 40 in the housing plate 10. The position of the hole 40 is shown in FIG. 9. Finally, all the components are connected together through the clamping of the jacket 1.

The operation of the device will be described below in detail. Six semi-punched bosses on the ratchet gear 2 are connected with the connecting plate of the recliner back thus connected with the recliner back. Four semi-punched bosses on the housing plate 10 are connected with the connecting plate of the recliner seat thus connected with the recliner seat.

When the external torque is transferred by the central shaft 17 to the cam 4 through the square hole 20 in the center of the cam 4, the bosses 18 on the two wedges 9 are moved by the cam grooves 19 on the cam 4 away from the central shaft 17 and the bosses 8 on the sliders 25 are brought by the two cam grooves 5 on the cam 4 to make translation toward the center until the slider teeth 6 are disengaged with the ratchet gear teeth 28 completely. At this time, the outer circumference 3 of the ratchet gear 2 and the inner circumference 15 of the housing plate 10 can rotate freely relative to each other so that angle-regulation of the recliner back is realized.

When the angle of the recliner back is regulated to a desired angle, the external torque is released. Urged by the return spring 27, the wedges 9 are brought by the cam grooves 19 of the cam 4 to make translation toward the center, such that the self-locking surfaces 30 of the wedges 9 contact with the self-locking surfaces 29 of the sliders 25 and the sliders 25 are pushed along the sliding grooves 13 of the housing plate 10 to make translation outwardly until the slider teeth 6 engage with the ratchet gear teeth 28 completely.

In this point, the angle of the recliner back can be locked at this angle due to the self-locking between the self-locking surfaces 30 of the wedges 9 and the self-locking surfaces 29 of the sliders. In addition, owing to the two segments of symmetrical ratchet gear teeth 28 and two segments of ratchet gear sliding surfaces 26 on the ratchet gear 2, when the slider teeth 6 face to the ratchet gear sliding surfaces 26, the slider teeth 6 can slide freely on the ratchet gear sliding surfaces 26. At this time, the device can be folded.

Figure 7:
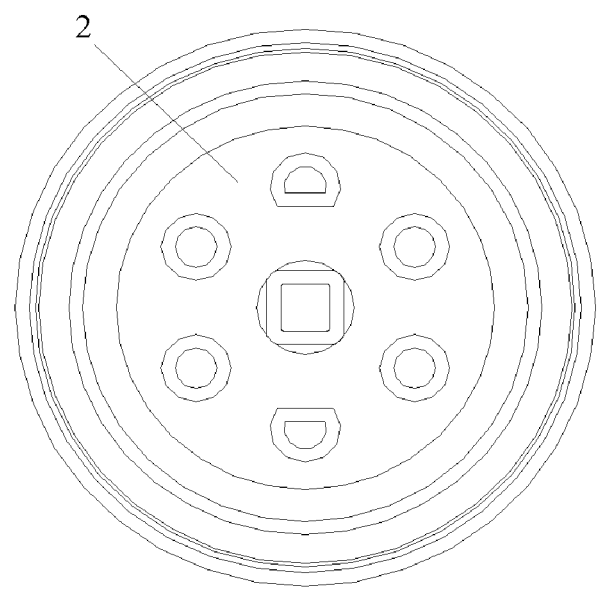
FIG. 7 is a front view of the assembled recliner regulating device according to the embodiment of the invention.
Figure 8:
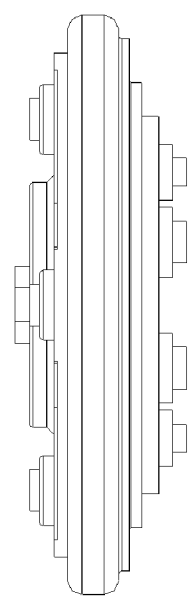
FIG. 8 is a left view of the assembled recliner regulating device according to the embodiment of the invention.

The shape of the above components after assembled is shown in FIG. 7 which is a front view of the embodiment. Six semi-punched bosses arranged circumferentially on the ratchet gear 2 are configured to connect with the connecting plate of the recliner back thus connect with the recliner back. FIG. 8 is a left view of the embodiment and FIG. 9 is a rear view of the embodiment. Four semi-punched bosses arranged circumferentially on the housing plate 10 are configured to connect with the connecting plate of the recliner seat thus connect with the recliner seat.

It is only given a design of two sliders and two wedges in the above embodiment, but the design is not limited to two sliders and two wedges. Three sliders and three wedges or more sliders and wedges can be used to carry out the device of the invention.

When the angle-regulation of the recliner is completed, the device of the invention enables the two symmetrical self-locking surfaces 30 of each wedge 9 to correspond with the self-locking surfaces 29 of the sliders 25 and form a two-point locking-up. When the ratchet gear teeth 28 engage with the slider teeth 6, the locking and unlocking of the sliders 25 with the ratchet gear 2 can be controlled through the rotation of the cam 4 driven by the external force and the force applied by the spiral return spring 27 so that the angle-regulation of the recliner back is realized. Since the ratchet gear 2 has two segments of evenly arranged ratchet gear teeth 28 and two segments of evenly arranged ratchet gear sliding surfaces 26, the recliner back can be quick-folded when the ratchet gear sliding surfaces 26 face to the slider teeth 6. The above components are fixedly attached by the jacket 1 into a relatively independent device which cannot be disassembled and free of maintenance. The device is versatile as it can be used with different connecting plates and applied to various vehicles depending on the user's requirements. The additional advantages of the invention are that the device has compacted structure, small volume, high strength, good unlocking performance on both sides, high regulation precision and the convenience of the angle-regulation and quick-folding of the recliner back, etc.

While the invention has been described above by way of embodiments, the invention is not limited to such embodiments. Various modifications, equivalent substitutions or improvements may be made to the invention without departing from the spirit and scope of the invention as set forth in the appended claims.

What is claimed is:

1. A recliner regulating device comprising:
   a central shaft;
   a cam connected with the central shaft, wherein the cam comprises first grooves and second grooves;
   a return spring connected with the central shaft and with the cam;
   a housing plate connected with the central shaft, the housing plate having first sliding grooves and second sliding grooves;
   a ratchet gear connected with the central shaft;
   wedges located on opposite sides of the central shaft, the wedges each having two self-locking surfaces and a boss, wherein the wedges are fitted in the first sliding grooves of the housing plate and the bosses are connected with the first grooves of the cam such that the first grooves drive the wedges; and sliders located on opposite sides of the central shaft, the sliders each having two self-locking surfaces and a boss, wherein the sliders are fitted in the second sliding grooves of the housing plate and the bosses are connected with the second grooves of the cam such that the second grooves drive the sliders, wherein the first grooves and the second grooves drive the wedges and the sliders in different directions relative to the central shaft;

wherein a two-point locking-up is formed between the self-locking surfaces of the sliders and the self-locking surfaces of the wedges when the sliders are driven away from the central shaft and the wedges are driven toward the central shaft.

2. The device according to claim 1, wherein the cam and the return spring are connected with the central shaft such that a square hole of the cam and an inner square hole of the return spring form a shaft connection through an outer square part of the central shaft.

3. The device according to claim 1, wherein the sliders have slider teeth and the ratchet gear has ratchet gear teeth; the slider teeth are disengaged with the ratchet gear teeth after the central shaft rotates; and after the cam is restored through the central shaft under the action of the return spring, the ratchet gear teeth engage with the slider teeth such that the two point locking-up between the self-locking surfaces of the sliders and the self-locking surfaces of the wedges is formed.

4. The device according to claim 3, wherein the ratchet gear further has ratchet gear sliding surfaces which come into contact with the ratchet gear teeth after the cam is restored through the central shaft under the action of the return spring.

5. The device according to claim 1, wherein the ratchet gear has bosses connecting with a connecting plate of the recliner back.

6. The device according to claim 1, wherein the housing plate has bosses connecting with a connecting plate of the recliner seat.

7. The device according to claim 1, wherein the device further includes a jacket connecting the ratchet gear with the housing plate.

8. A recliner regulating device comprising:
a central shaft;
sliders having slider teeth that engage with a ratchet gear having ratchet teeth to secure the device in a particular position;
first and second wedges located on opposite sides of the central shaft, wherein the first and second wedges have two locking surfaces that interact with the sliders to maintain the device in the particular position and form a two point locking-up with each of the first and second wedge; and
a cam having first grooves and second grooves, the first grooves connecting with the sliders and the second grooves connecting with the first and second wedges, wherein the first and second grooves are configured to drive the sliders and the first and second wedges to release the two point locking-up when the cam is rotated by an external force.

* * * * *